United States Patent
Liang et al.

(10) Patent No.: US 9,897,189 B2
(45) Date of Patent: Feb. 20, 2018

(54) WAVE SPEED REDUCER HAVING SELF-LOCKING FUNCTION AND COMPOUND TYPE REDUCER DEVICE

(71) Applicants: PRODRIVES & MOTIONS CO., LTD., Taipei (TW); Chia-Sheng Liang, Taipei (TW)

(72) Inventors: Chia-Sheng Liang, Taipei (TW); Hung-Tai Cheng, Taipei (TW); Szu-Ming Huang, Taipei (TW)

(73) Assignees: PRODRIVES & MOTIONS CO., LTD., Taipei (TW); Chia-Sheng Liang, Taipei (TW)

( * ) Notice: Subject to any disclaimer, the term of this patent is extended or adjusted under 35 U.S.C. 154(b) by 309 days.

(21) Appl. No.: 14/961,836

(22) Filed: Dec. 7, 2015

(65) Prior Publication Data

US 2017/0009867 A1  Jan. 12, 2017

(30) Foreign Application Priority Data

Jul. 7, 2015 (TW) .............................. 104122029 A

(51) Int. Cl.
*F16H 35/00* (2006.01)
*F16H 49/00* (2006.01)
*F16H 1/46* (2006.01)

(52) U.S. Cl.
CPC ............. *F16H 49/001* (2013.01); *F16H 1/46* (2013.01); *F16H 2049/003* (2013.01)

(58) Field of Classification Search
CPC ...................................................... F16H 49/01
USPC ............................................................ 74/640
See application file for complete search history.

(56) References Cited

U.S. PATENT DOCUMENTS

| | | | | |
|---|---|---|---|---|
| 1,444,717 A | 2/1923 | Webb | | |
| 2,906,143 A | 9/1959 | Musser | | |
| 4,003,272 A | * 1/1977 | Volkov | ................... | F16H 49/001 74/640 |
| 4,643,047 A | * 2/1987 | Distin | ..................... | F16H 25/06 475/168 |
| 4,909,098 A | * 3/1990 | Kiryu | ...................... | F16C 33/40 384/532 |
| 5,061,227 A | * 10/1991 | Fickelscher | ......... | F04C 15/0065 475/166 |
| 5,643,128 A | 7/1997 | Kennedy | | |
| 7,086,309 B2 | * 8/2006 | Stoianovici | ............... | F03C 1/04 74/640 |

* cited by examiner

*Primary Examiner* — Ha Ding Ho
(74) *Attorney, Agent, or Firm* — Chun-Ming Shih

(57) ABSTRACT

The invention provides a wave speed reducer having a self-locking function comprising a structure for outputting driving rotation of a bearing member or a spline wheel at a specific reduction ratio which drives rollers to rotate by a cam. A designed convex arc of the cam has self-locking function of restricting the rollers to reversely rotate so as to form a compound type reducer device having a multi-reducer function by mutually combining the wave speed reducer and a planetary gear set. To solve conventional problems, poor driving accuracy at tiny rotation angle and scarcity of self-locking function for conventional reducers are improved.

21 Claims, 11 Drawing Sheets

WAVE SPEED REDUCER HAVING SELF-LOCKING FUNCTION AND COMPOUND TYPE REDUCER DEVICE

BACKGROUND OF THE INVENTION

1. Field of the Invention

The present invention relates to a structural arrangement technique of a reducer, particularly to a speed reducer having a self-locking function and a compound type reducer device thereof.

2. Description of Related Art

In the structural arrangement technical field of conventional reducers, the self-locking function to be studied herein meant that driving power was loaded on an active member so as to generate forward output at a specific reduction ratio from a driven follower. When no driving power was loaded on the active member to be a free end, driving power (including a driving force exerted by an external power source, a driving force from torque generated by their gravity force of the follower and its connected members) was so loaded on the follower that it could not drive the active member of the free end to reversely rotate, i.e. the so-called "self-locking". The "self-locking" meant a mechanism generated at a tooth flank between the active member and the engaged follower except of device arrangement (for example, a driven or reciprocating level, a positioning latch or a pin), such as, events latch, etc., manufacturing cost of which increased.

Conventional reducers generally included a mechanism having a worm wheel driven by a worm shaft, a planetary gear, and a spin-wave driver. Only the mechanism having a worm wheel driven by a worm shaft was designed by modification of engaging angle between tooth flank of the worm shaft and tooth flank of the worm wheel so as to achieve the above self-locking objective.

Please refer to FIGS. 1 and 2 which disclosed a schematic diagram showing an arrangement of conventional worm wheels and worm shafts and their lead angle. They demonstrated that a lead angle α was formed at an engaged a tooth flank between a general worm shaft 71 and a worm wheel 72. For the worm shaft 71, the lead angle α(the so-called friction angle) is formed by a slope formed from a worm shaft lead L and a worm shaft circumference length S. When the worm shaft 71 of the active member rotated, a positive force F was exerted from a tooth flank 71a of the worm shaft 71 onto a tooth flank 72a of the worm wheel 72 of the follower. A component force Fsinα generated in the clockwise direction of the lead angle α by using the positive force F was smaller than the friction force μ×Fcosα (μ is a frictional coefficient between the tooth flank 71a and the tooth flank 72a) generated at the tooth flanks 71a, 72a between the worm shaft 71 and the worm wheel 72, a self-locking effect was generated. In other words, at the state of self-locking design, a reverse rotation of the worm wheel 72 forced to reversely drive the worm shaft 71 because the tooth flank 71a and 72a was engaged. An advantage of the self-locking function is that every transmission component of the reducer mechanism was protected from un-predictable reverse rotation, thus, there should be no damages or risk.

In addition to the above mechanism of the worm shaft driving the worm wheel, there were no self-locking mechanism mounted on the conventional planetary gears and spin-wave driver till now. Conventional spin-wave drivers and planetary gears belong to typical speed reduction gearing devices. A spin-wave driver was a speed reduction gearing device. The first spin-wave driver invented was a Harmonic® driver disclosed in U.S. Pat. No. 2,906,143 filed in 1955 by C. W. Musser. After continuous improvement, details of a spin-wave driver mechanism were disclosed in U.S. Pat. No. 5,643,128.

In comparison to conventional planetary gears, conventional spin-wave drivers could provide more number of teeth on engaged gears and a larger amount of gear range, therefore, conventional spin-wave drivers provided better driving accuracy and driving efficiency regarding output value of the whole ratio of reduction.

Furthermore, in the conventional techniques, there were no wave-motions involved in the present invention. A similar wave-motion of the prior arts was the above spin-wave driver.

A general conventional spin-wave driver comprised a cam (or a so-called wave generator), a plurality of rollers and a spline wheel (having specific internally toothed circular spline wheel) from inside to outside. The cam was used as a input shaft. The plurality of rollers were arranged around a location between the cam and the spline wheel. A plurality of spline apertures which could accommodate rollers to engage were arranged on the spline wheel in ring-shaped form. The cam was used to drive some of the plurality of rollers by providing input force so as to engage the corresponding spline apertures of the spline wheel in order to rotate a bearing member at a ratio of reduction.

Furthermore, from the contents of the patents, it can be known that every spline aperture in the conventional spin-wave drivers comprises a tilting tooth flank extending along both sides of a void between the teeth and the tooth flank and the tooth flank at both sides extents and connects to a crest of teeth at both sides. The contour shape of each spline aperture is approximately V-shaped. Some of the rollers in the conventional spin-wave driving process would engage with tooth flank of the engaged spline aperture driven by a cam surface of the cam. Then, the tooth flank of the spline aperture was used as an effective contact surface for transmitting driving force of the rollers. For example, in U.S. Pat. No. 5,643,128, it was disclosed that a bearing member (roller ring) for receiving a plurality of rollers were arranged between the cam and the spline wheel. In some embodiments, the bearing member is used as an output shaft so as to drive the bearing member to rotate at a ratio of reduction by a force provided by rollers driven and transmitted by a driving force of the cam via transmission of the tooth flank of the spline aperture.

From the above descriptions, it could be known that not only the tooth flank of the spline apertures could be used as an effective contacting surface for transmitting working force, but also it could be used as an effective contacting surface for providing force to the rollers from the cam. We could observe that during the spin-wave driving process, when the cam surface pushed and drove the rollers to contact the tooth flank of the spline apertures, the driven rollers moved to a displacement at a radial direction regarding to the cam axis and to an angular displacement at an angular direction surrounding the cam axis. Then, the displacements would affect whether the tooth flank could be an effective contacting surface for sufficiently or really transmitting functional force and providing force generated by the cam. The conventional spin-wave drivers could maintain good driving accuracy and driving efficiency. However, in prior arts, the contour of the disclosed spline apertures is in V-shaped form. The well-known patents did not disclose or teach or study that the techniques of forming the contour of spline apertures and the cams were capable of effectively transmitting functional force, such as, when an input shaft rotated for half a circle, the rollers would move into a next position of the spline aperture. During the procedures, the speed would become uncertain because of an unclear definition of the V-shape so that the speed of the roller moving into the next spline aperture would become unstable. The driving accuracy of the conventional spin-wave drivers regarding output end under variation of tiny rotational angle would be affected.

SUMMARY OF THE INVENTION

The objective of the present invention is to solve a problem that poor driving accuracy in view of tiny rotation angle at an output end for a conventional wave-motion mechanism is improved by using a wave speed reducer. A cam of the wave speed reducer is designed self-locking is implemented when reverse transmission occurs between the cam, a roller, a bearing member and a spline aperture so as to solve the problem of no self-locking function for the conventional wave-motion mechanism.

The so-called "wave speed reducer" defined in the present invention has functions of a cam, a roller, a bearing member and a spline wheel which is summarily the same as a conventional wave-motion. However, the driving waves generated by the wave speed reducer in the present invention (or the called wave-motion) are harmonic waves.

In order to achieve the objective and to solve the problems, a preferred embodiment of the present invention provides a wave speed reducer having a self-locking function comprising in co-axial arrangement:

a cam at a cam axis circumference of which being a cam periphery comprising one or more formed convex arcs;

a spline wheel disposed around the cam circumference, a plurality of spline apertures being arranged at an inner wall of the spline wheel; and a bearing member disposed between the cam and the spline wheel, a plurality of bearing apertures being arranged at equal distance at a bearing member circumference, a roller being disposed at an active space of every bearing aperture, the cam driving the convex arc to rotate by an input force, the convex arc being powered to drive the roller to move into a corresponding spline aperture so as to actuate a rotational output at a specific reduction ratio generated by one of the spline wheel and the bearing member;

wherein, formation of the convex arc is restricted by the following equation:

$$F \times R \sin\theta < R \times \mu \times F \cos\theta$$

$$0 < \theta \leq 4°$$

wherein, F is a positive force for the roller pressing on the convex arc, R is a distance between a contact point of the convex arc and the roller and a cam axis, θ is a lead angle of the positive force F, μ is a relative friction coefficient between the convex arc and the roller. The lead angle means an angle formed by a tangent line of contact points between the rollers and the cam and a vertical line connected from the contact points to the cam axis.

According to the preferred embodiment of the present invention, in the following equation:

$$F \times R \sin\theta = T_1$$

$$R \times \mu \times F \cos\theta = T_2$$

wherein, $T_1$ is a rotation torque exerting on the convex arc by the roller, $T_2$ is a rotation torque of a component force ($\mu \times F \cos\theta$) for a friction force ($\mu \times F$) when the convex arc contacts the roller.

According to the present invention, the effect and advantages are the wave speed reducer has self-locking function. In particular, when one of the bearing member and the spline wheel used as an output end carries out reverse transmission to be used as an input end, self-locking function occurs between the cam, the roller, the bearing member and the spline member via the formation of the convex arc so as to protect transmission components in the reducer mechanism from unpredictable reverse rotation and from damages and danger.

According to the present invention, a method for designing a cam periphery comprising the following steps:

(A) slicing radial direction movement track of a roller between a cam and a spline aperture and circumference direction rotation track at equal proportion at equal time intervals to sequentially obtain circle centers and points of tangency of the track circles during movement of the roller;

(B) connecting the points of tangency to form a unit cam circumference segment of a cam periphery; and (C) forming the cam periphery by mirroring and projecting the unit cam circumference segment respectively based on a X-coordinate and Y-coordinate from a cam axis.

According to the present invention, X-coordinates and Y-coordinates ($X_m$, $Y_m$) of the circle centers of the track circles are obtained according to the following equation $$[X_m, Y_m] = [(L_f - M \cdot \Delta y') \cdot \sin(M \cdot \Delta \alpha), (L_f - M \cdot \Delta y') \cdot \cos(M \cdot \Delta \alpha),]$$

wherein, $L_f$ is a distance between a cam axis and a circle center of the track circle of a roller far away from the cam axis, M is an amount for equally dividing the single-sided tooth flank contour of the spline aperture, $\Delta y'$ is an equal divided amount of an effective radial displacement for each of the track circles of the roller, $\Delta \alpha$ is an equal amount of an effective rotational angle for each of the track circles of the roller.

According to the present invention, X-coordinates and Y-coordinates ($X'_m$, $Y'_m$) of the points of tangency of the track circles are obtained according to the following equation $$\{X'_m, Y'_m\} = \left\{ X_m + \left(\frac{R_d}{2}\right) \cdot \sin\left[\tan^{-1}\left|\frac{(Y_m - Y_{m-1})}{(X_m - X_{m-1})}\right|\right], \right.$$

$$\left. Y_m + \left(\frac{R_d}{2}\right) \cdot \cos\left[\tan^{-1}\left|\frac{(Y_m - Y_{m-1})}{(X_m - X_{m-1})}\right|\right] \right\}$$

wherein, m is an integer representing a $m^{th}$ track circle during movement of the roller, m is an integer larger than zero, $R_d$ is a diameter of the roller, ($X_{m-1}$, $Y_{m-1}$) is an X-coordinate and Y-coordinate ($X_m$, $Y_m$) of the $m^{th}$ circle center of the track circles.

According to the present invention, a method for designing a spline surface contour comprising the following steps:

(A) slicing radial direction movement track of a roller between a cam and a spline aperture and circumference direction rotation track at equal proportion at equal time intervals to sequentially obtain circle centers and points of tangency of the track circles during movement of the roller;

(B) connecting the points of tangency to form a single-sided tooth flank contour on spline aperture between a tooth crest and a void between the teeth; and (C) forming a correspondent side tooth flank contour by mirroring the single-sided tooth flank contour based on a centerline of the void between the teeth in order to form the spline surface contour by connecting a void contour between the single-sided tooth flank contour and the correspondent side tooth flank contour.

According to the present invention, X-coordinates and Y-coordinates $(X_n, Y_n)$ of the circle centers of the track circles are obtained according to the following equation $$[X_n, Y_n] = [(L_f - N \cdot \Delta y) \cdot \sin(N \cdot \Delta \theta), (L_f - N \cdot \Delta y) \cdot \cos(N \cdot \Delta \theta),]$$

wherein, $L_f$ is a distance between a cam axis and a circle center of the track circle of a roller far away from the cam axis, N is an amount for equally dividing the single-sided tooth flank contour of the spline aperture, $\Delta y$ is an equal divided amount of an effective radial displacement for each of the track circles of the roller, $\Delta \theta$ is an equal divided amount of an effective rotational angle for each of the track circles of the roller.

According to the present invention, X-coordinates and Y-coordinates $(X'_n, X'_n)$ of the points of tangency of the track circles are obtained according to the following equation $$\{X'_n, Y'_n\} = \left\{X_n + \left(\frac{R_d}{2}\right) \cdot \sin\left[\tan^{-1}\left|\frac{(Y_n - Y_{n-1})}{(X_n - X_{n-1})}\right|\right], \right.$$
$$\left. Y_n + \left(\frac{R_d}{2}\right) \cdot \cos\left[\tan^{-1}\left|\frac{(Y_n - Y_{n-1})}{(X_n - X_{n-1})}\right|\right]\right\}$$

wherein, n−1 is an integer representing a $n^{th}$ track circle during movement of the roller, n is an integer larger than zero, $R_d$ is a diameter of the roller, $(X_{n-1}, Y_{n-1})$ is an X-coordinate and Y-coordinate $(X_n, Y_n)$ of the $n^{th}$ circle center of the track circles.

According to the present invention, a method for designing a spline wheel contour comprising the following steps:
applying the designing method of claim 1; and
based on a rotational center of the cam axis, arranging an array of internal cam faces around the spline wheel at equal circumference distance on the spline surface contour to form a spline wheel contour.

In order to achieve technical effects of the cam periphery, the spline surface contour and the spline wheel contour, under the condition of obtaining self-locking function of the wave speed reducer, the method can design a tooth flank contour in order to design a cam circumference segment of a spline wheel, and can design a cam periphery matched with the spline apertures in the spline wheel according to the ideal moving way of the rollers in the roller-type wave-motion so as to sufficiently and really transmit driving force exerted from the rollers via a tooth flank during a process of the cam surface pushing the rollers to contact tooth flank of the spline apertures. The tooth flank can be used as an effective contact surface of the cam for providing force to the rollers in order to maintain good driving accuracy and driving efficiency at a ratio of reduction of a certain output value for the roller-type wave-motion, and the driving accuracy at the output end of the roller-type wave-motion is increased.

In accordance with the implementation of the present invention, those skilled in the art can know that self-locking restraining conditions are not contradict and matched with the designing method of the cam periphery.

In accordance with one embodiment of the present invention, there is provided a compound type reducer device for applying to the wave speed reducer comprising a planetary gear set combined at one side of the wave speed reducer and a cam with a tooth ring at a cam inner surface, wherein the planetary gear set comprises a plurality of planetary gears disposed at a periphery surface of a wheel disk at its one side and spaced apart at equal distance and engaged with each of the tooth rings on the cam, the wheel disk is connected to a spin-wave driver by a shaft. The planetary gear set further comprises a sun gear through which the sun gear is connected to the spin-wave driver by a shaft, the plurality of planetary gears respectively are engaged with the sun gear for receiving transmission.

In accordance with one embodiment of the present invention, the plurality of planetary gears further comprises a periphery gear used as a fixing end and combined to a circumference of the plurality of planetary gears which comprises a plurality of gear sets, each of which comprises a front gear and a rear gear co-axially arranged, the front gears are engaged with the periphery gear and the plurality of planetary gears are respectively engaged with the tooth ring of the cam by the rear gears. Furthermore, a ring disk is formed and extends from a center of the bearing member to be used as an output shaft. The convex arc is used to drive the rollers because a component force generated by the rollers and the spline aperture drives the ring disk of the bearing member to output rotation force.

In accordance with another embodiment of the present invention, a compound type reducer device for applying to the wave speed reducer comprising a planetary gear set combined at one side of the wave speed reducer, wherein the planetary gear set comprises
a sun gear connected to a spin-wave driver by a shaft; and
a plurality of planetary gears disposed at a periphery surface of a cam at its one side and spaced apart at equal distance and respectively engaged with a periphery of the sun gear to drive and rotate the cam.

In accordance with another embodiment of the present invention, the plurality of planetary gears comprises:
a first set planetary gear comprising front gears disposed at a periphery surface of a wheel disk at its one side and spaced apart at equal distance, the plurality of planetary gears being combined and engaged with a periphery of the sun gear via the front gears, a center gear being disposed and fixed at a rotation center of the wheel disk at its another side; and
a second set planetary gear comprising rear gears disposed at a periphery surface of a cam at its one side and spaced apart at equal distance, the rear gears being combined and engaged with a periphery of the center gear.

wave speed in order to achieve the wave speed reduction function of the compound type wave speed reducer, the planetary gear set will generate the first stage of reduction effect, and the second stage wave reducer generates a second stage of wave speed reducing effects, the combination of the first and second stage of wave speed reduction will create a compound wave speed reduction effect. The first stage planetary wave speed reduction set can be designed with various wave speed reduction ratio in order to meet the demand of the users Other objectives, advantages, and novel features of the invention will become more apparent from the following detailed description when taken in conjunction with the accompanying drawings.

DETAILED DESCRIPTION OF THE PREFERRED EMBODIMENT

Figure 1:
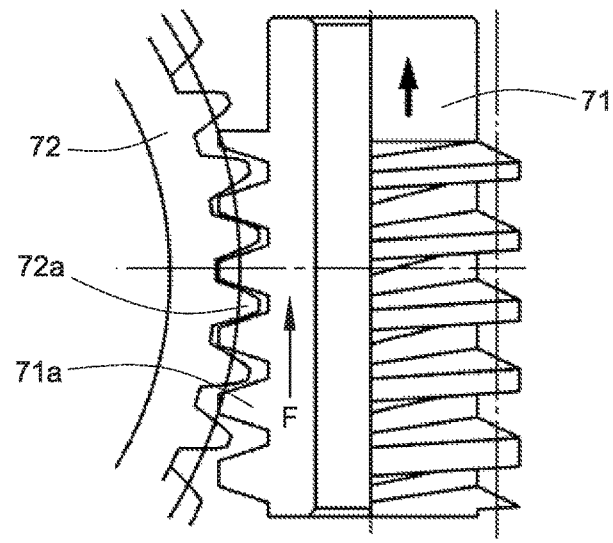
FIG. 1 is an arrangement schematic diagram of a conventional worm shaft and a conventional worm wheel.
Figure 2:
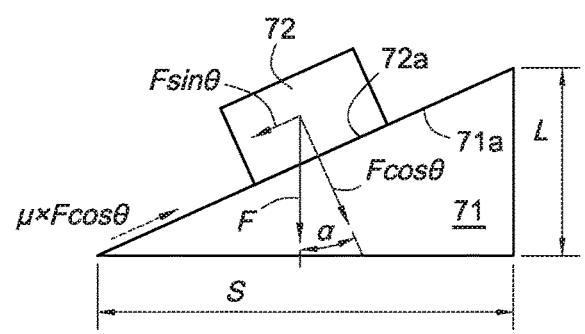
FIG. 2 is a schematic diagram showing a lead angle between the conventional worm shaft and worm wheel of FIG. 1.
Figure 3:
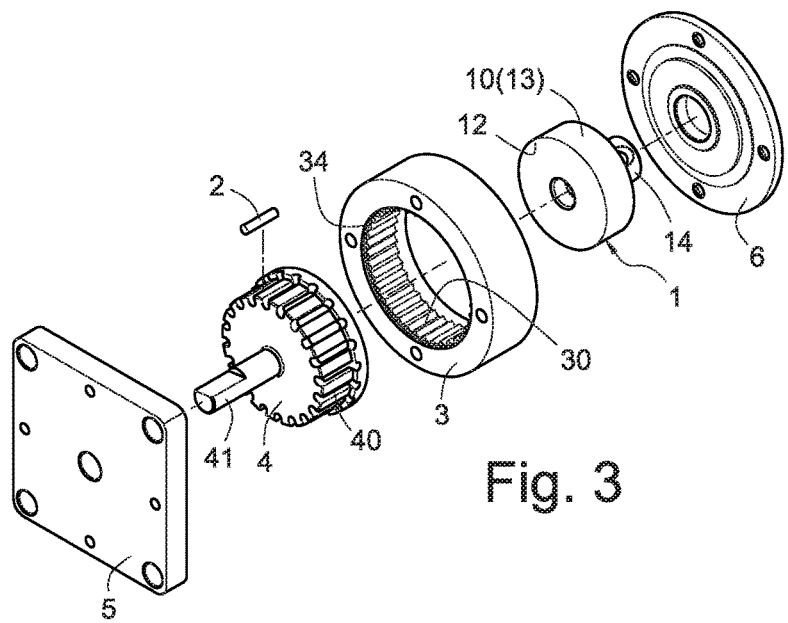
FIG. 3 is a three-dimensional explosive view of a wave speed reducer of the present invention.
Figure 4:
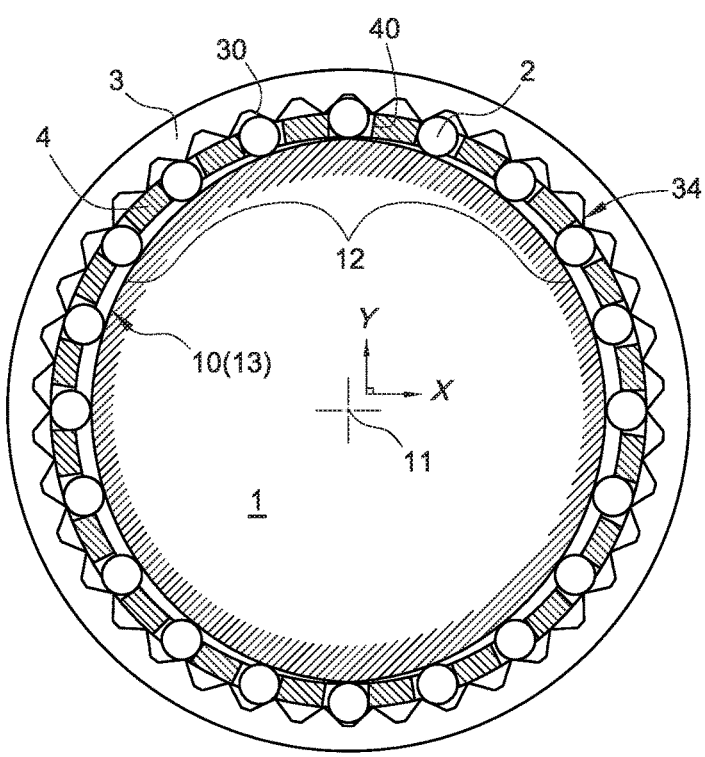
FIG. 4 is a cross-section view of the wave speed reducer of FIG. 3 of the present invention.

Please refer to FIGS. 3 and 4 which respectively demonstrate the members and the arrangement of the wave speed reducer designed in the present invention. A cam 1, a plurality of rollers 2, a bearing member 4 and a spline wheel 3 are arranged co-axially from inside to outside between a seat 5 and a cover 6 in the wave speed reducer. An input shaft 14 is disposed at the axial position of the cam 1 to be used as an input end of the force of the wave speed reducer. The input shaft 14 can be transmitted rotational energy to input and drive the cam 1 to rotate. A convex arc 12 in spline line shape and located relatively far from the axis 11 is disposed in a cam surface 10 of the cam 1. The convex arc 12 is used as an effective functional area for pushing and driving the roller to transmit power. A cam periphery 13 is formed on the cam 1. In a preferred embodiment of the invention, the roller 2 is in cylinder shape. But, the roller 2 might be a bearing bead used as a roller part. The spline wheel 3 is in ring shape and is disposed co-axially at the outside of the cam surface 10 of the cam 1. A plurality of spline apertures 30 are disposed at the inner wall of the spline wheel 3 so as to accommodate the roller 2 to be arranged between the cam surface 10 of the cam 1 and the spline apertures 30 of the spline wheel 3. The bearing member 4 is disposed between the cam 1 and the spline wheel 3. A plurality of bearing apertures 40 for accommodating the rollers 2 to rotate are disposed at equal distance of the circumference of the bearing member 4.

Figure 4A:
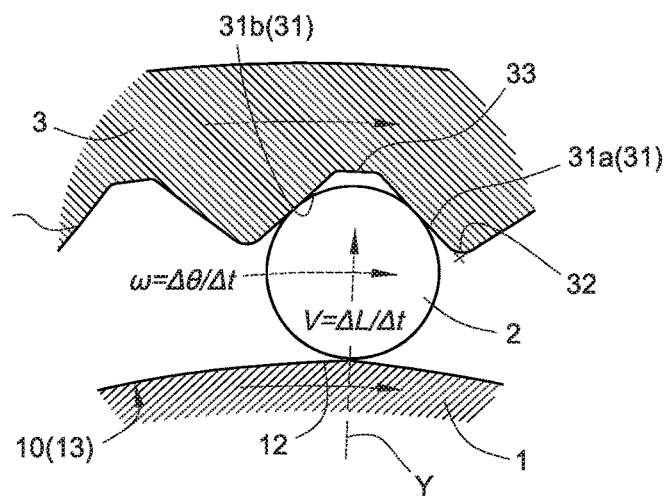
FIG. 4a illustrates an enlarged view of a cam, a roller and a spline aperture of FIG. 4 of the present invention.

Please refer to FIG. 4a which shows an enlarged schematic diagram demonstrating the special relationship of the spline aperture 30, the cam 1 and the roller 2. In the preferred embodiment of the invention, FIG. 4a demonstrates that the convex arc 12 of the cam surface 10 drives some rollers 2 to move into a relative location of the spline apertures 30 so as to contact the spline surface contour 31, then, the bearing member 4 is driven by the transmitted driving force to generate an output rotation at a predetermined ratio of reduction.

For facilitating demonstration, in a preferred embodiment, the input shaft 14 the cam 1 is used as an input end and the spline wheel 3 is used to form an output shaft 41 at an axial position of the bearing member 4 as an output member. In a scope of the present invention, the bearing member 4 is included to demonstrate that the spline wheel 3 is used as an output end. Moreover, no matter the spline wheel 3 or the bearing member 4 is used as an output end, it will not affect the results showing the demonstration of the spline surface contour, the spline wheel contour and the cam periphery.

In the above example, the spline surface contour 31 comprises a single-sided tooth flank contour 31a and a correspondent side tooth flank contour 31b formed at a mirroring location of it. A void contour 33 is formed between the single-sided tooth flank contour 31a and the correspondent side tooth flank contour 31b to form a spline wheel contour 34 (as shown in FIG. 4) by an array of the spline surface contour 31 to surround it. When the spline wheel contour 34 is formed, a single-side tooth flank contour 31a and a correspondent side tooth flank contour 31b of each spline surface contour 31 are respectively connected to a tooth crest contour 32 at a relatively far side to show the details of the spline wheel contour 34. The said spline wheel contour 34 is referred to a specific contour of the inner wall of the spline wheel 3.

Figure 5:
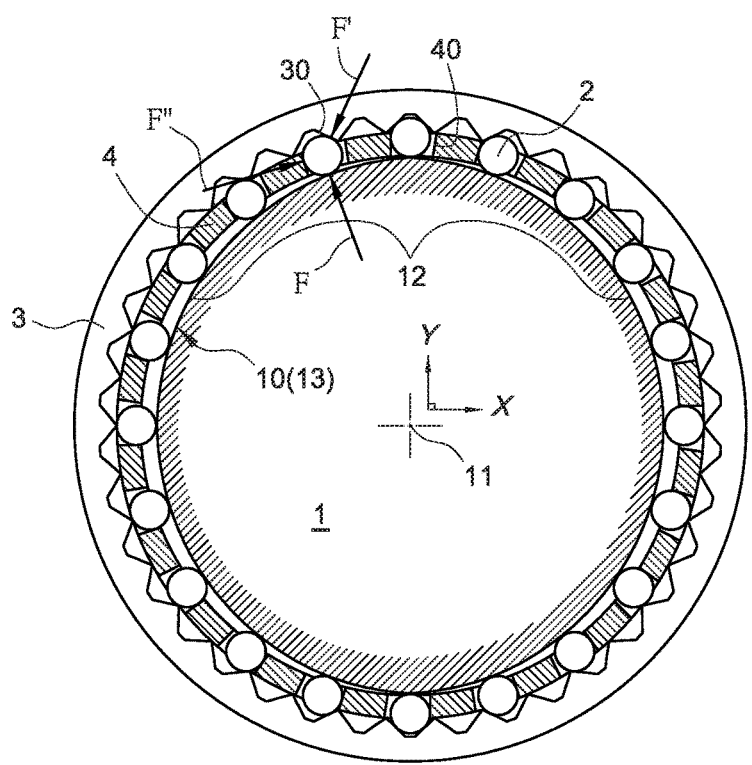
FIG. 5 illustrates a schematic diagram showing force balance between the cam, the roller and the spline aperture of FIG. 4 of the present invention.

In addition to the above details of the wave speed reducer of the present invention, in order to have self-locking function, in a force system in which force form the convex arc 12 is used and pushed to contact the rollers 2 so as to contact the bearing member 4 and the spline aperture 30, a lead angle θ is designed. The details of the lead angle θ are explained as follows:

Please refer to FIG. 5. A cam 1 having a convex arc 12, a roller 2, a bearing member 4 and a spline aperture 30 shown in FIG. 4 is disclosed to show state of a force system balance. When the cam 1 rotates counter-clockwise to drive, a function force F from the convex arc 12 is exerted on the roller 2 to press and contact so as to generate a component force F' from the spline surface contour 31 relative to the roller 2. A component force F" from the bearing aperture 40 of the bearing member 4 is generated to exert on the roller 2. At the same time, the three forces F, F', F" will generate state of a force system balance.

Figure 6:
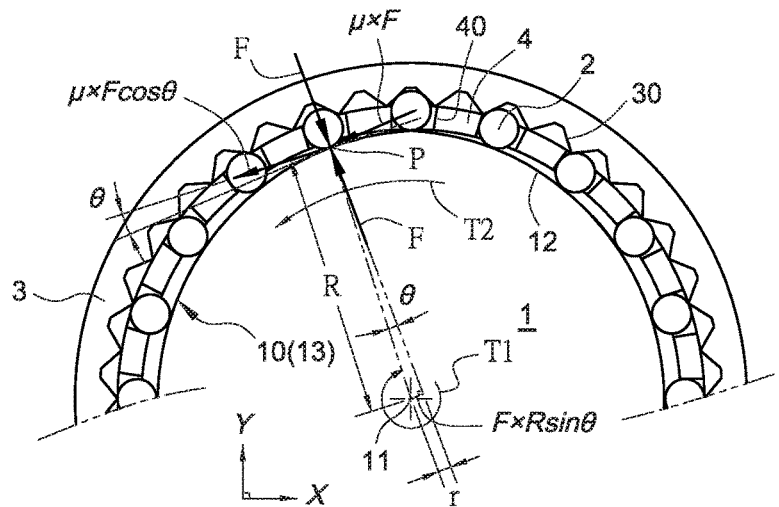
FIG. 6 is a schematic diagram showing a lead angle between the cam, the roller and the spline aperture of FIG. 5 of the present invention.

Please refer to FIG. 6 which shows a schematic diagram in which when the convex arc 12 shown in FIG. 5b presses and pushes the roller 2, a contact point P is formed between the convex arc 12 and the roller 2. A distance R from the contact point P and cam axis 11 is shown. From the principle of force and reaction force, it can be known that a positive force F originating from the roller 2 which exerts on the convex arc 12 at the contact point P is the same as the force F by which. A friction force u×F is formed at the contact point P, wherein μ is a relative friction coefficient between the convex arc and the roller. Because the shape of the convex arc 12 is not a real circular cam circumference segment in comparison with the axis 11 of the cam 1, a angle θ is formed by crossing a function line along the positive force F at the contact point P with a connecting line of distance R from the contact point P to the cam axis 11. In the present invention, the angle θ is defined as a lead angle θ. A friction component force μ×Fcosθ is formed and generated by dividing the friction force u×F with existence of the lead angle θ.

From FIG. 6, it can be known that near the rotation center 11 of the cam 1, a function line r which is vertical to the positive force F is formed. By the equation r=Rsinθ and by the formation of the lead angle θ, when the roller 2 exerts the positive force F onto the convex arc 12, it will generate a torque $T_1$ exerting from the rotation center 11 of the cam 1 with an equation of $T_1$=F×r=F×Rsinθ. When the convex arc 12 contacts with the roller 2, a friction force μ×F is generated. Thus, a friction component force μ×Fcosθ will form a torque $T_2$ onto the rotation center 11 of the cam 1 with an equation of $T_2$=R×μ×Fcosθ. When $T_1$<$T_2$, the wave speed reducer of the present invention can achieve self-locking effects. Therefore, when the convex arc 12 is designed in the present invention, the design must meet the requirements of the following equation (1)

$$F \times R \sin\theta < R \times \mu \times F \cos\theta$$

After calculation of the above equation (1), the lead angle θ can be obtained through the following equation (2)

$$\frac{\sin\theta}{\cos\theta} = \tan\theta < \mu \quad (\theta < \tan^{-1} \mu)$$

According to the equation (2), the convex arc 12, the roller 2, the bearing member 4 and the spline aperture 30 of the cam 1 are made of steel. A relative friction coefficient μ between a first steel material and a second steel mater is between 0.1~0.12 obtained from a material table. The present invention assumes the relative friction coefficient between the convex arc 12 and the roller 2μ=0.07 and enters it into the equation (2) to get the lead angle θ<4'. It can be known that the resulting relative friction coefficient between the convex arc 12 and the roller 2μ=0.07 is smaller than the values of 0.1~0.12 obtained from the material table. Thus, when 0<θ≤4°, it can achieve the self-locking effect.

The self-locking effect means when the bearing member 4 (or it is replaced by the spline wheel 3) used as an output end reversely transits as an input end of the cam 1, it is restricted by the equation (1) to limit the lead angle into a range of 0<θ≤4°, the self-locking effect occurs between the cam 1, roller 2, bearing member 4 and the spline wheel 3 so as to protect the transmission components of the reducer mechanism from un-predictable reverse rotation and damages and rick (will explain later).

Figure 7:
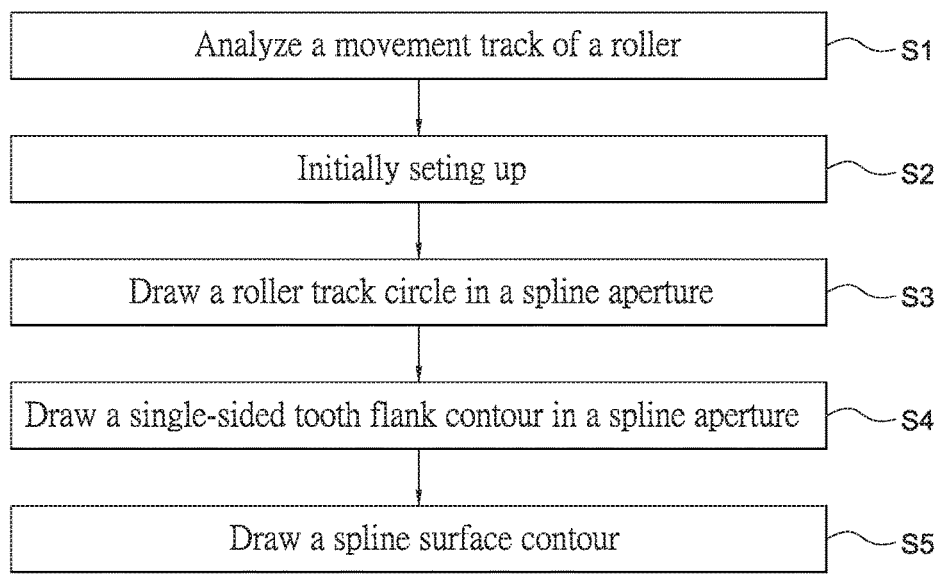
FIG. 7 is a flowchart showing a process and steps for designing a spline surface contour according to the invention.

In order to meet the requirements of the lead angle θ, the present invention provide a preferred design plan regarding the spline surface contour 31 comprising steps of S1 to S5 (as shown in FIG. 7).

Step S1: designing a movement track of a roller;

Before the arrangement of cam periphery 13 and spline surface contour 31 is known, the movement track of the roller 2 is analyzed firstly. In more details, when the convex arc 12 of the cam surface 10 contacts the roller 2 to gradually push to generate two kinds of movement velocities in the spline aperture 30. The two movement velocities include a radial movement velocity v in the radial direction of the cam axis 11 and an angular velocity w in the rotational direction relative to the circumference of the cam 1 (as shown in FIG. 4a). A radial displacement amount L is equally divided by an unit time t to get a radial displacement velocity v (ΔL=v×Δt). The unit time t is used to divide an effective rotation angular θ in the circumference direction to get an angular velocity ω (Δθ=ω×Δt) so as to obtaining and simulating movement tracks of the roller 2 in spline aperture 30 and to draw track circles (as shown in steps 2 to 4).

step S2: initially setting up.

Figure 8:
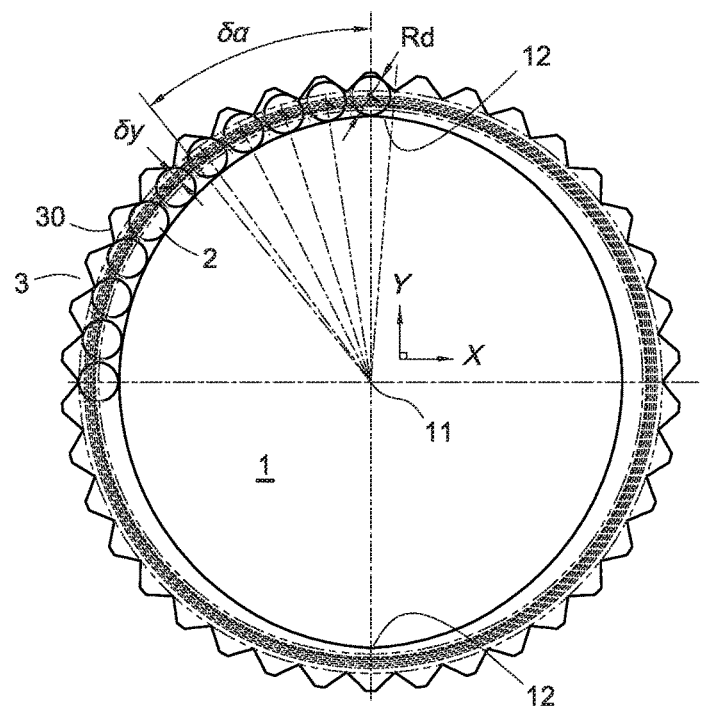
FIG. 8 is a cross-sectional view showing a spline surface contour and a cam periphery according to the invention.

In order to meet the requirements of good ratio of reduction and arrangement dimensional size, FIG. 8 can be drawn by the following data and steps in the following examples. FIG. 8 is demonstrated to show a figure in four quadrants of X-Y coordinate system, especially to show a figure of track circles of the roller 2 in the second quadrant by using the set parameters. The set-up parameters are as follows:

1. a set amount $R_n$ of the rollers $R_n$=40. In order to make sure that the rigidity of the bearing apertures 40 is excellent, the actual amount of the rollers and bearing apertures is a half of $R_n$.
2. a set amount $C_n$ of the convex arcs of the cam 1 $C_n$=2.
3. an amount of the spline apertures $S_n$=$R_n$−$C_n$=40−2=38.
4. a roller diameter $R_d$=2.0 mm.
5. an effective function amount $E_n$ of the rollers is non-integer number, for example $E_n$=5.3.

step S3: drawing track circles of the rollers in the spline apertures.

Figure 9:
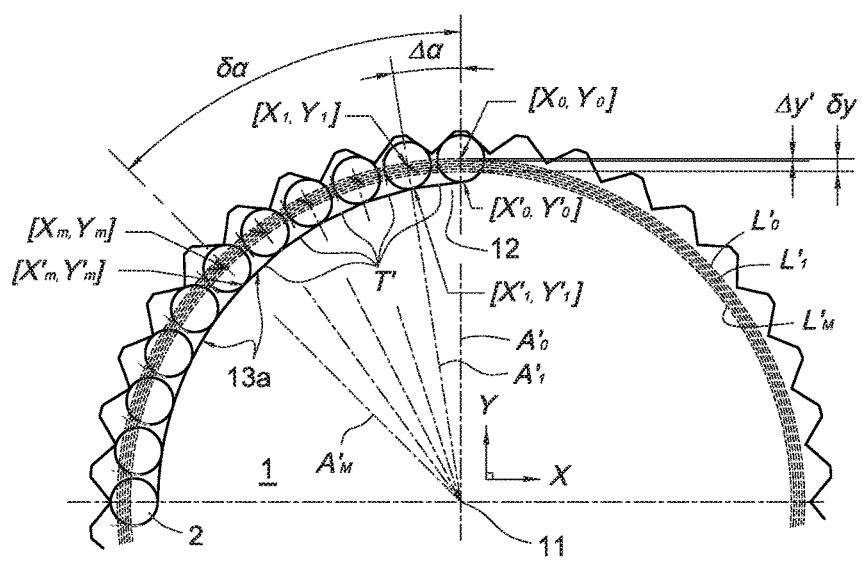
FIG. 9 is an enlarged schematic diagram showing an effective movement range of track circles of rollers in the cam circumference according to the invention.

According to set arrangement of step 2, a figure of an effective movement range of the roller track circles is drawn as shown in FIG. 9 based on the following parameters and definition.

After the status of FIG. 9, an appropriate equal amount M for the effective movement range (including the effective radial displacement amount δy and the effective circumference displacement angle δθ) is drawn and divided. The equal amount M is used as an equal amount for dividing the cam periphery 13. A proportionally equal amount of effective radial displacement divided by the equal amount M (e.g. M=300) for a radial displacement Δy' of each track circle is as follows:

$$\Delta y' = \frac{\delta y}{M} = \frac{0.52}{300} = 0.0017333 \text{ mm}.$$

The arc lines generated are numbered from outside to inside as $L'_0, L'_1, L'_2, \ldots L'_M$ (M=300). The rotational angle Δα of each roller track circle for an effective rotational angle obtained by divided using an predetermined equal amount of M is as follows:

$$\Delta\alpha = \frac{\delta\alpha}{M} = \frac{38.7}{300} = 0.129°.$$

The radiation lines generated are numbered from left to right as $A'_0, A'_1, A'_2, \ldots, A'_M$ (M=300).

Thus, each intersection point intersected by the arc lines $L'_0, L'_1, L'_2, \ldots, L'_M$ and the radiation lines $A'_0, A'_1, A'_2, \ldots, A'_M$ are used as circle centers of the roller track circles to sequentially draw track circles (roller diameter $R_d$=2.0 mm) The margin between the roller 2 and the cam surface 10 is considered. For example, a pre-determined margin for a roller diameter $R_d+$=2.0+0.04=2.04 mm. The X, Y-coordinates $(X_m, Y_m)$ of the circle centers of the track circles are obtained as the following equation (3)

$$[X_m, Y_m] = [(L_f - M \cdot \Delta y') \cdot \sin(M \cdot \Delta \alpha), (L_f - M \cdot \Delta y') \cdot \cos(M \cdot \Delta \alpha),]$$

From the above descriptions, the coordinates of the $0^{th}$ circle center is $[X_0, Y_0] = [0, L_f] = [0, 14.6]$. The coordinates of the $2^{th}$ circle center is $[X_1, Y_1] = [-0.032868, 14.598230]$. It can be inferred that the coordinates of the $(m+1)^{th}$ circle center is $[X_m, Y_m] = [-8.8034166, 10.988460]$ (when m=M=300 equally divided).

step S4: drawing a unit cam circumference segment of the cam.

After the above step S3, a tangent T' is formed to connect two neighboring track circles. A $1^{th}$ circle point of tangency for each T' is selected and coordinates $[X'_m, Y'_m]$ of each circle point of tangency are calculated by the following equation (4)

$$\{X'_m, Y'_m\} = \left\{ X_m + \left(\frac{R_d}{2}\right) \cdot \sin\left[\tan^{-1}\left|\frac{(Y_m - Y_{m-1})}{(X_m - X_{m-1})}\right|\right], \right.$$
$$\left. Y_m + \left(\frac{R_d}{2}\right) \cdot \cos\left[\tan^{-1}\left|\frac{(Y_m - Y_{m-1})}{(X_m - X_{m-1})}\right|\right] \right\}$$

wherein, $X_{m-1}, Y_{m-1}$ are coordinates of the circle center of the $m^{th}$ track circle.

From the above descriptions, point of tangency coordinates $[X'_0, Y'_0] = [0.053785, 13.601447]$ of a $1^{th}$ track circle, point of tangency coordinates $[X'_1, Y'_1] = [0.023171, 13.599801]$ of a $2^{th}$ track circle are sequentially obtained. It can be inferred that point of tangency coordinates $[X'_m, Y'_m] = [-8.135657, 10.244083]$ of a $(m+1)^{th}$ track circle (when m=M=300 as equal amount for dividing) are obtained. The points of tangency in the second quadrant are connected by using spline lines to form a single body, i.e. to form unit cam circumference segment 13a in the cam periphery 13. The points of tangency covered and connected by tangent T' are the spline line contour location of the partial convex arc 12 of the cam 1 in the second quadrant. A range of the unit cam circumference segment 13a formed and connected by the spline lines includes the spline line contour of the partial convex arc 12 and the cam surface of the part other than convex arc 12.

step S5: drawing cam periphery.

Please refer to FIGS. 4 and 9 which is a schematic diagram showing a unit cam circumference segment 13a (as shown in FIG. 9) formed in the $2^{th}$ quadrant drawn in step S40. Based on a cam axis 11, the cam periphery 13 is respectively mirrored and projected to the 1th, 3th and $4^{th}$ quadrants across the X-coordinate and Y-coordinate. The so-called "respectively mirrored and projected" includes a mirroring projection across the X-coordinate and then a mirroring projection across the Y-coordinate, or a mirroring projection across the Y-coordinate and then a mirroring projection across the X-coordinate so as to form images of the unit cam circumference segment 13a in any of the four quadrants. In order to sequentially mirror and project the image onto the other three quadrants and to project the images onto the all four quadrants of X-Y coordinate system, a whole drawing of cam periphery 13 (as shown in FIG. 4) is formed by surrounding around. The extra lines and tips of the unit cam circumference segment 13a generated at an intersection point on the Y-coordinate can be revised in round angle way or in small arc way.

The word "effective" in the above descriptions means to be effective at angle range when the roller 2, the spline wheel 3, the cam 1 and the bearing member 4 simultaneously contact. Out of the angle range, the word "effective" should be "ineffective". The limiting condition (equation (1)) of the lead angle should be incorporated and implemented in a process that the convex arc 12 can effectively contact and push the roller 2 to move in an angle range.

Figure 10:
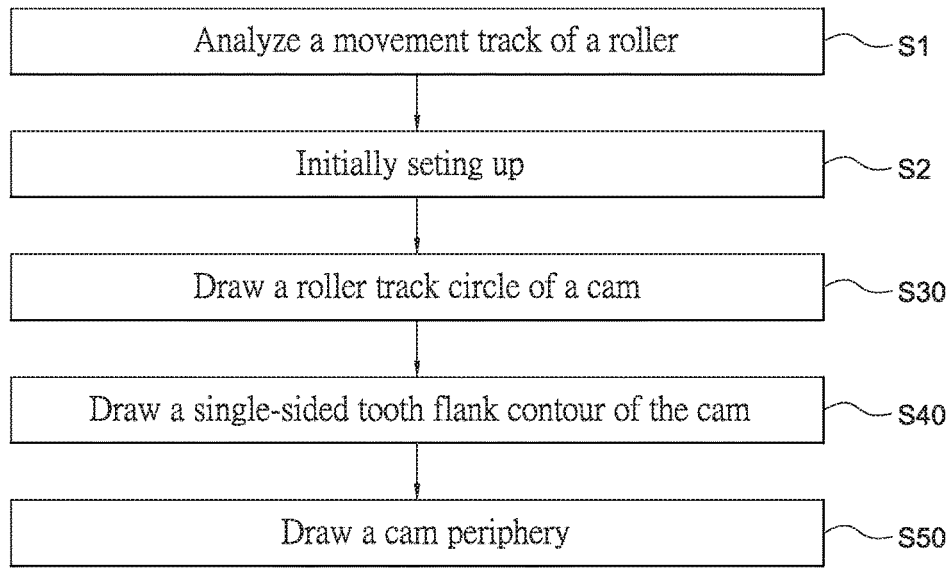
FIG. 10 is a flowchart showing a process of designing a spline surface contour according to the invention.

Furthermore, the present invention can provide a method of designing a spline surface contour 31, more specific, it comprises steps of executing steps S30 to Step 50 (shown in FIG. 10) after the steps of Step S1 to step S2.

step S30: drawing track circles of the rollers in the spline apertures.

Figure 11:
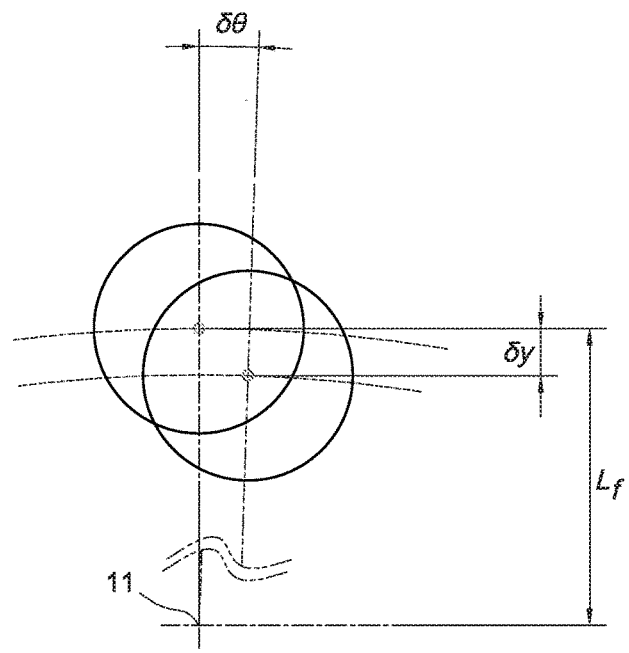
FIG. 11 is an enlarged schematic diagram showing an effective movement range of track circles of rollers in the spline aperture of FIG. 8 according to the invention.
Figure 12:
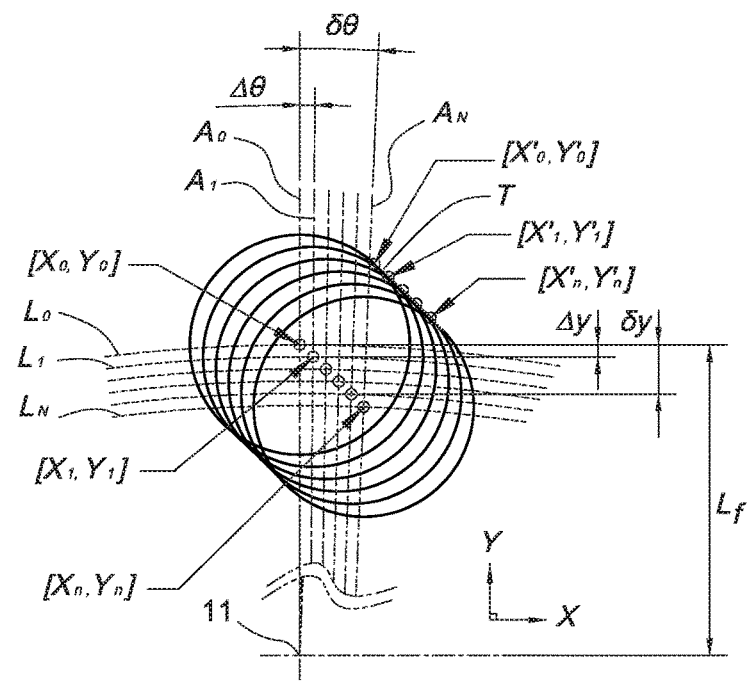
FIG. 12 is schematic diagram showing an equal amount dividend of the effective movement range of track circles of the rollers of FIG. 11 according to the invention.

According to set-up arrangement of step 2, a figure of an effective movement range of the roller track circles is drawn as shown in FIG. 11 (matched with FIG. 8) based on the following parameters and definition of the above example:

6. a distance $L_f$ between a circle center of a roller track circles of farest cam axis 11 and the cam axis 11, predetermined coordinates $(0, L_f)$, wherein $L_f$=14.6 mm.

7. a tangent angle between two initially set-up track circles in the example: 44.5°~45.5°.

8. an effective radial displacement of the roller: 0.52 mm.

9. an effective circumference angle of the roller $\delta\alpha$, $$\delta\alpha = \frac{360}{R_n} \times (E_n - 1) = \frac{360}{40} \times (5.3 - 1) = 38.7°$$

(as shown in FIG. 3).

10. from the above descriptions, a relative angular difference $\Delta\beta$ between the spline aperture and the roller is calculated:

$$\Delta\beta = \frac{360}{R_n} - \frac{360}{S_n} = \frac{360}{38} - \frac{360}{40} = 0.47368° \text{(not shown)}.$$

11. a displacement angle $\delta\theta$ of an effective function range of the single-sided tooth flank contour 31a of the set-up spline aperture 30, i.e.

$$\delta\theta = \left(\frac{360}{R_n} - \frac{360}{S_n}\right) \times (E_n - 1) = \left(\frac{360}{38} - \frac{360}{40}\right) \times (5.3 - 1) = 2.0368°.$$

After the status of FIG. 11, an appropriate equal amount N for the effective movement range (including the effective radial displacement amount $\delta y$ and the effective circumference displacement angle $\delta\theta$) is drawn and divided. The equal amount N is used as an equal amount for dividing the single-sided tooth flank contour 31a of the spline aperture as shown in FIG. 6. A proportionally equal amount of effective radial displacement divided by the equal amount N (e.g. N=100) for a radial displacement $\Delta y$ of each track circle is as follows:

$$\Delta y = \frac{\delta y}{N} = \frac{0.52}{100} = 0.0052 \text{ mm}.$$

The arc lines generated are numbered from outside to inside as $L_0, L_1, L_2, \ldots L_N$. The rotational angle $\Delta\theta$ of each roller track circle for an effective rotational angle obtained by divided using an predetermined equal amount of N is as follows:

$$\Delta\theta = \frac{\delta\theta}{N} = \frac{2.0368}{100} = 0.02038°.$$

The radiation lines generated are numbered from left to right as $A_0, A_1, A_2, \ldots, A_N$.

Thus, each intersection point intersected by the arc lines $L_0, L_1, L_2, \ldots L_N$ and the radiation lines $A_0, A_1, A_2, \ldots, A_N$ are used as circle centers of the roller track circles to sequentially draw track circles (roller diameter $R_d$=2.0 mm) The X, Y-coordinates $(X_n, Y_n)$ of the circle centers of the track circles are obtained as the following equation (5)

$$[X_n, Y_n] = [(L_f - N \cdot \Delta y) \cdot \sin(N \cdot \Delta\theta), (L_f - N \cdot \Delta y) \cdot \cos(N \cdot \Delta\theta),]$$

Wherein, n represents a numbering integer of the track circles for each roller. n is an integer larger than zero.

From the above descriptions, the coordinates of the $0^{th}$ circle center is $[X_0, Y_0]=[0, L_f]=[0, 14.6]$. The coordinates of the $1^{th}$ circle center is $[X_1, Y_1]=[0.005188, 14.594799]$. It can be inferred that the coordinates of the $(n+1)^{th}$ circle center is $[X_n, Y_n]=[0.500433, 14.071104]$ (when n=N=100 equally divided).

step S4: drawing a unit cam circumference segment of the cam.

After the above step S30, a tangent T is formed to connect two neighboring track circles. A $1^{th}$ circle point of tangency for each T is selected and coordinates $[X'_n, X'_n]$ of each circle points of tangency are calculated by the following equation (2)

$$\{X'_n, Y'_n\} = \left\{ X_n + \left(\frac{R_d}{2}\right) \cdot \sin\left[\tan^{-1}\left|\frac{(Y_n - Y_{n-1})}{(X_n - X_{n-1})}\right|\right], \right.$$
$$\left. Y_n + \left(\frac{R_d}{2}\right) \cdot \cos\left[\tan^{-1}\left|\frac{(Y_n - Y_{n-1})}{(X_n - X_{n-1})}\right|\right] \right\},$$

wherein, $X_{n-1}, Y_{n-1}$ are coordinates of the circle center of the $n^{th}$ track circle.

From the above descriptions, point of tangency coordinates $[X'_0, Y'_0]=[0.707959, 15.306254]$ of a $1^{th}$ track circle, point of tangency coordinates $[X'_1, Y'_1]=[0.713524, 15.300675]$ of a $2^{th}$ track circle are sequentially obtained. It can be inferred that point of tangency coordinates $[X'_n, Y'_n]=[1.245266, 14.738354]$ of a $(n+1)^{th}$ track circle (when n=N=100 as equal amount for dividing) are obtained.

Spline lines are used to connect the points of tangency of the circles to form a surface body. The single-sided tooth flank contour 31a between the tooth crest and tooth void is formed on the spline aperture 30. It should be noted that the tooth crest and the tooth void are the so-called predetermined space which is virtual having no real contour lines. Those skilled in the art can understand that a tooth crest and a tooth void are formed at both ends of the spline aperture tooth flank. According to the step S2, from the parameters, such as the amount $S_n$ of the spline apertures, the amount $R_n$ of the rollers and roller diameter $R_d$, the distance between the tooth crest and the tooth void on the spline wheel can be known for facilitating formation of single sided tooth flank contour 31a and the contour of the tooth crest and the tooth void after the correspondent side tooth flank contour 31b is formed.

step S50: drawing spline surface contour.

After step S40, please refer to FIG. 4, a centerline Y (actually is a connecting line between a circle center of the $0^{th}$ track circle and the cam axis 11 in FIG. 6) of virtual tooth void is used to mirror an image of the single-sided tooth flank contour 31a to form the correspondent side tooth flank contour 31b.

Circle points of tangency of two neighboring track circles between the single-sided tooth flank contour 31a and the correspondent side tooth flank contour 31b are connected and a real tooth void contour 33 which does not interfere with the circle surface of the track circles is formed at the tooth void location, then, e.g. contour lines of convex or arc shape are formed. The spline surface contour 31 is formed by connecting the void contour 33 between the single-sided tooth flank contour 31a and the correspondent side tooth flank contour 31b. The virtual tooth crest portion is drawn after the whole spline wheel contour 34 is form.

Figure 13:
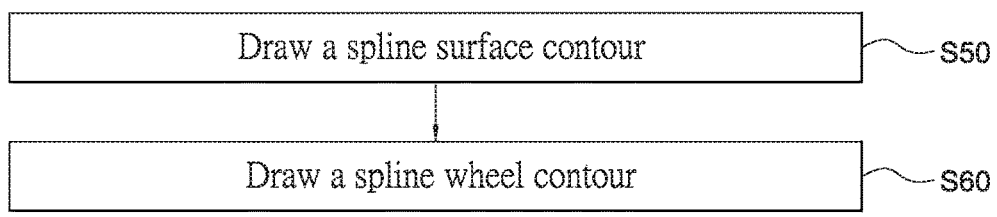
FIG. 13 is a flowchart showing a process of designing a spline wheel contour according to the invention.

Another embodiment of the invention is to implement drawing a spline wheel contour 34. In more details, the embodiment comprises the step S50 of drawing spline surface contour 31 and implementing the following step S60 (as shown in FIG. 13).

Step S60: drawing the spline wheel contour.

After the step S50, the cam axis 11 is used as a rotational center (as shown in FIG. 9), and an array spaced away at equal distance on the circumference of spline surface contour 31 having predetermined amount $S_n$ of spline apertures surrounds around an inner surface of the spline wheel 3 to form the spline wheel contour 34. The so-called equal space on the circumference means a distance formed by the predetermined virtual tooth crests.

In more details, the tooth crest portion is drawn to form a real tooth crest contour 32 (as shown in FIG. 4) comprising tips far from the single-sided tooth flank contour 31a and the correspondent side tooth flank contour 31b for each spline surface contour 31 are connected in an arc. The meaning of "tips relatively far from are connected in round angle way" is that circle points of tangency of two correspondent track circles at the farest location between the single-sided tooth flank contour 31a and the correspondent side tooth flank contour 31b for each spline surface contour 31 are connected linearly in an arc so as to form an arrangement completely exhibiting the spline wheel contour 34 connecting the tooth crest contours 32 between the spline surface contours 31. The tooth crest contour 32 is used for guiding the roller 2 to move into the adjacent spline aperture 30 to contact the spline surface contour 31. The roller guiding includes a continuous contact-type guidance or non-continuous contact-type guidance or non-contact-type guidance.

The formation technique of forming the cam periphery 13, the spline surface contour 31 and the spline wheel contour 34, the wave speed reducer has self-locking function. When the cam periphery 10 pushes the roller 2 to contact the tooth-flank contours 31a, 31b of spline wheel 3, the driving force fully really exerted from the roller 2 by using the tooth flanks. The tooth flanks is capable of providing effective contact surface generating a component force by the roller 2 onto the cam 1 in order to further providing increasing driving accuracy at the output end of the wave speed reducer when the wave speed reducer maintains its driving accuracy and driving efficiency of its output end at a reduction ratio.

Please refer to FIGS. 14 to 17 which respectively disclose structural arrangement details of the preferred embodiments of the compound type reducer device of the present invention by applying and combining the above wave speed reducer. As a whole, the example includes a plurality of planetary gear set 800 combined to one side of the wave speed reducer.

In the example, the main components, their structural arrangement and configuration of the wave speed reducer of FIG. 3 are slightly different from those of this example. The conditions, formation techniques and structural arrangement of the wave speed reducer disclosed in FIGS. 4 to 13 are fundamentally the same as those of the example.

Figure 14:
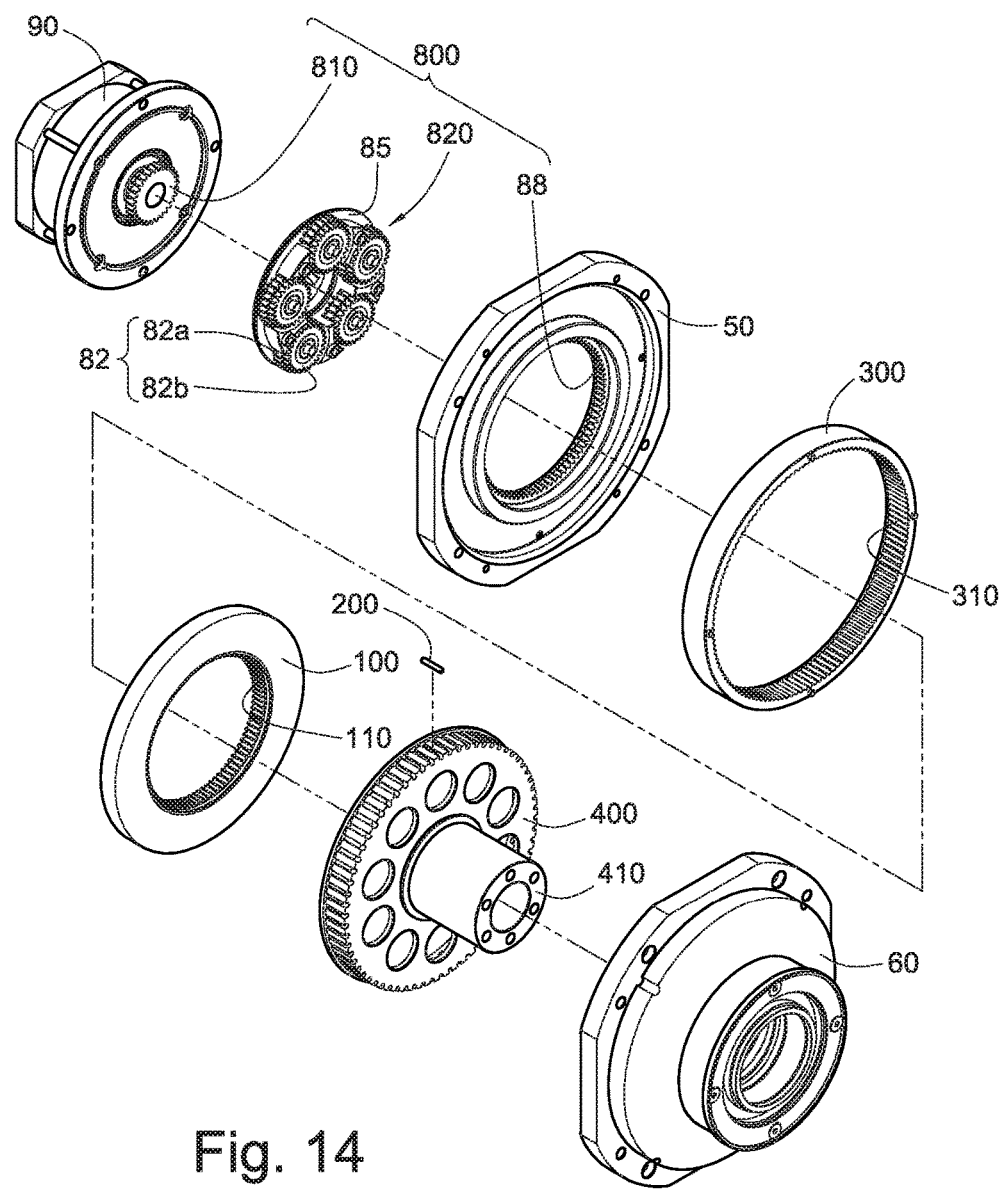
FIG. 14 is a three-dimensional explosive view of a first embodiment of a compound type reducer device of the present invention.

Please refer to FIG. 14. The members and the arrangement of the wave speed reducer designed in the example are the same. A cam 100, a plurality of rollers 200, a bearing member 400 and a spline wheel 300 are arranged co-axially from inside to outside between a seat 50 and a cover 60 in the wave speed reducer. The cam 100 is used as the input end in the example. The bearing member 400 is used as the output end by fixing to the spline wheel 300.

As shown in FIG. 14, the main differences between FIG. 14 and the FIG. 3 are that in part 50 within the planetary gear set 800, there is an internal gear structure 88. Also input cam 100 which provide power input into the second stage of the speed reduction has no input shaft, it is replaced with internal gear 110 structure, 110 and 100 also share the same axis of rotation in order to provide an interface between power input and output. The rest of the structure is basically the same between FIG. 14 and FIG. 3

As shown in FIG. 14, the planetary gear set 800 includes a sun gear 800 and multiple planetary gears 820. The combining view of FIG. 14, FIG. 15 and FIG. 17 reveals that sun gear 810 is connected to an actuator 90, the actuator 90 can be selected from a variety of motors which can provide the required level of input to drive the sun gear 810, for example, a servo motor or a stepper motor can be used. The planetary gear carrier 85 has an opening in the center for the sun gear 810 to pass through in order to create gear meshing between sun gear 810 and planetary gears 820.

Figure 15:
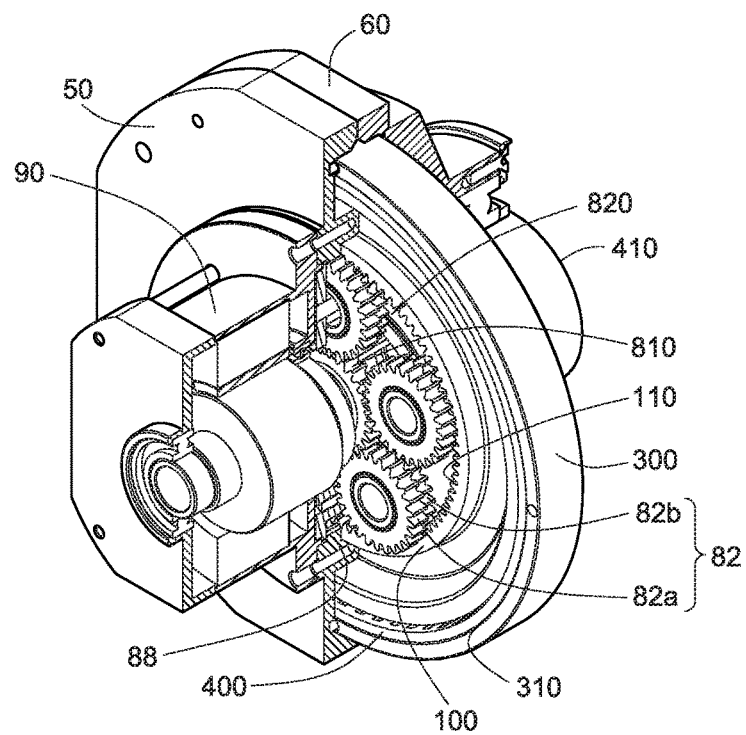
FIGS. 15 and 16 are respectively three-dimensional explosive view of the compound type reducer device of FIG. 14 viewed at different angles.
Figure 16:
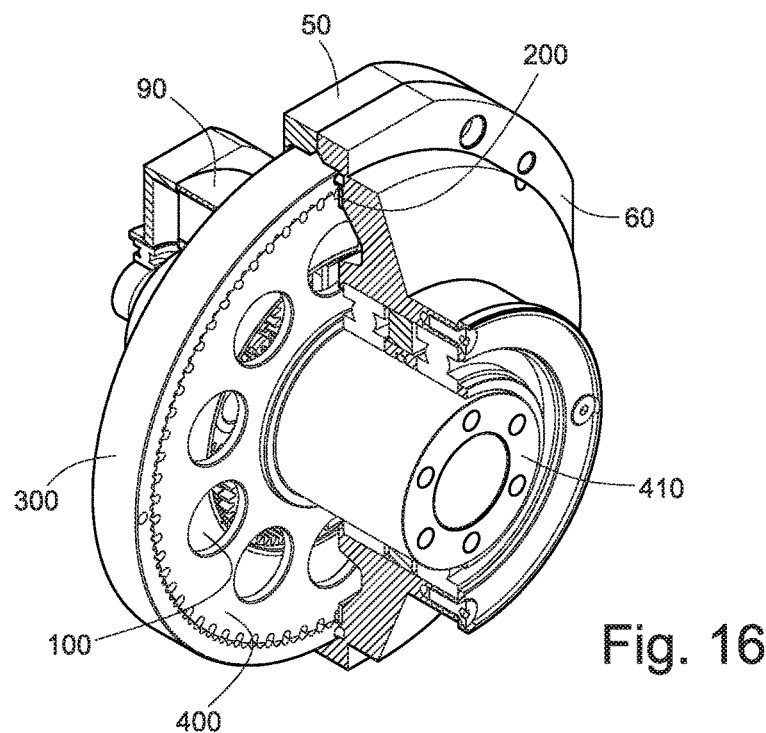
Figure 17:
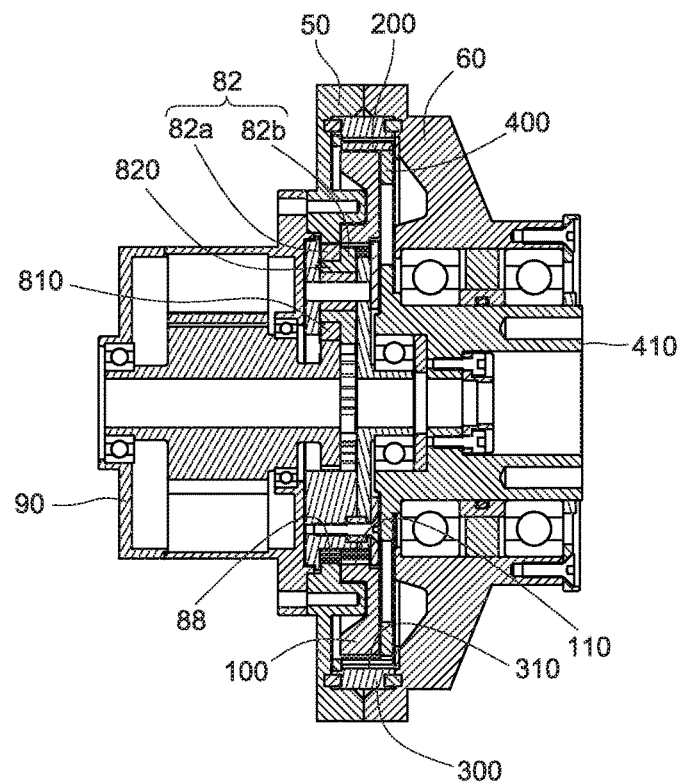
FIG. 17 is a cross-section view of the compound type reducer device of FIG. 14 of the present invention.

From FIGS. 15 and 17, it can be known the plurality of planetary gears 820 are respectively engaged with a periphery of the sun gear 810. The plurality of planetary gears 820 are respectively engaged with the tooth ring 110 at an inner periphery location of the cam 100. The periphery gear 88 is engaged with a periphery of the plurality of planetary gears 820.

From FIGS. 15 and 17, it can be known that the plurality of planetary gears 820 maybe comprises a plurality of gear sets 82 in implementation. Each gear set 82 comprises a front gear 82a and a rear gear 82b co-axially arranged. The front gears 82a are engaged with the periphery gear 88. Because the periphery gear 88 is formed and fixed to the seat 50, the periphery gear 88 can provide guidance and supporting for the front gear 82a so as to stably drive the front gears 82a by the sun gear 810 and to surround and rotate around the sun gear 810 and the periphery gear 88. A first stage output rotation at a reduction ratio is formed. A second stage output rotation at a reduction ratio is formed after the rotation process the tooth ring 110 of the cam 100 is engaged with the rear gears 82b co-axially arranged together with the front gears 82a. Thus, by using the wave speed reducer shown in the examples, the cam 100 outputting a rotation force at a second stage reduction ratio can drive parts of the rollers 200 to relatively move into the spline apertures 310 to contact with the spline surface contour in order to transmit driving power of a third stage reduction ratio to drive the bearing member 400 to rotate.

Those skilled in the art will easily know that output at multi-reduction ratio respectively through the planetary gear 800 and the wave speed reducer can be generated for a compound arrangement of the planetary gear 800 and the wave speed reducer to meet the requirements and needs at the output end.

Figure 14A:
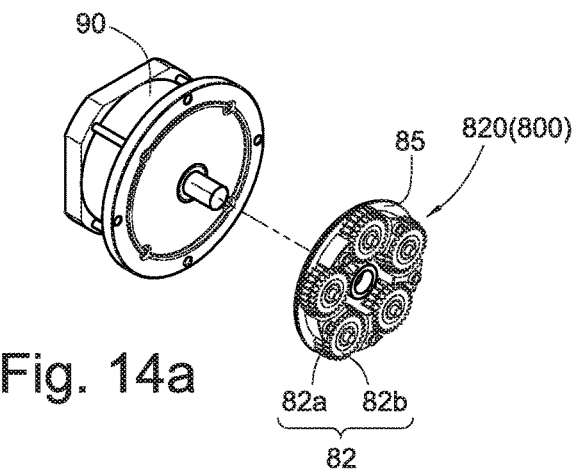
FIG. 14a is a partial explosive view of another embodiment of a compound type reducer device of FIG. 14 of the present invention.

In the example of FIGS. 14 to 17, in order to meet the requirements of different reduction ratios provided by the planetary gear set 800, the sun gear 810 can be omitted. It is implemented in FIG. 14a which demonstrate the planetary gear set does not include a sun gear and no holes for allowing passage of the sun gear are arranged at a disk center of the wheel disk 85. Alternatively, a shaft hole is arranged at the disk center of the wheel disk 85 and connected to a center axis of the spin-wave driver 90. In the implementation, a reduction ratio generated after no sun gear drives the plurality of planetary gears 820 will be omitted. The alternative reduction ratio can be obtained after the spin-wave driver 90 directly drives the plurality of planetary gears 820 and the cam 100 is driven.

In the example of FIGS. 14 to 17, a ring disk 410 is formed by extend from a center of the bearing member 400. The ring disk 410 is used in the similar way as the output shaft 41 does in FIG. 4 in order to connect the ring disk 410 to the outside to connect to the driving objects (for example, a mechanical arm).

Figure 18:
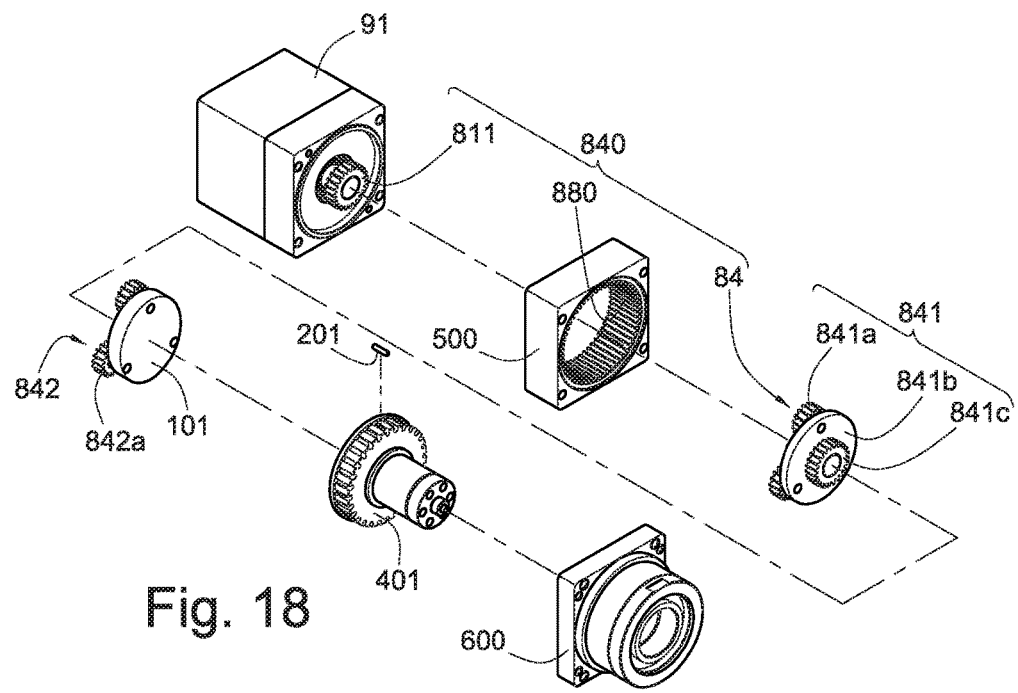
FIG. 18 is a three-dimensional explosive view of a second embodiment of the compound type reducer device of the present invention.
Figure 19:
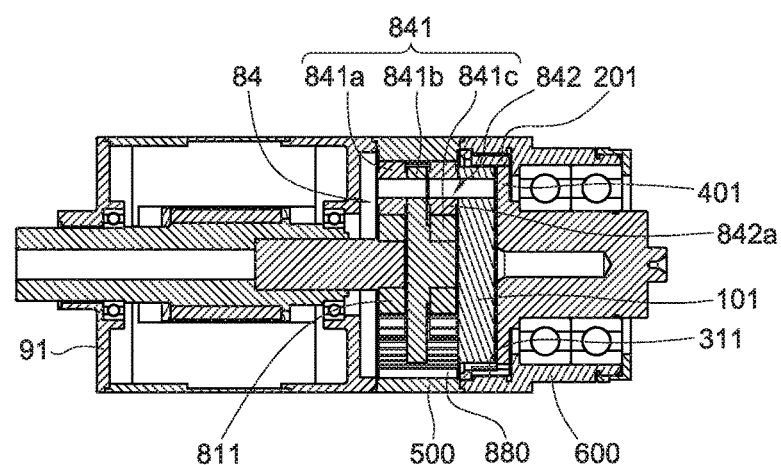
FIG. 19 is a schematic diagram showing of the compound type reducer device of the present invention shown in FIG. 18.

Please refer to FIGS. 18 and 19 which disclose another embodiment of multi-reduction ratio output of the compound type reducer device of the present invention. FIGS. 18 and 19 differ from FIGS. 14 to 17 in that the planetary gears 84 of the planetary gear set 840 are disposed at equal distance at edge circumference of the cam 101 and engaged with periphery of the sun gear 811. In more details, The planetary gears 84 can be divided into a first set planetary gear 841 and a second set planetary gear 842. The first set planetary gear 841 comprises front gears 841a which are disposed at equal distance at edge circumference of the wheel disk 841b and a center gear 841c which are disposed at equal distance at edge circumference of the wheel disk 841b. The second set planetary gear 842 comprises rear gears 842a which are disposed at equal distance at edge circumference of the cam 101 and engaged with periphery of the center gear 841c in order to be used as a power input interface of the cam 101 for the rear gears 842a. The front gears 841a are engaged with the periphery gear 880 located at the seat 500 used as a fixing end. Alternatively, no tooth rings can be disposed on the cam 101 to be a solid body. In addition to the above differences, the structure of this example is the same as that in the above examples.

According to the structural configuration, the spin-wave driver 91 which is connected to the sun gear 811 by a shaft is engaged with the front gears 841a to rotate around the periphery gear 880, and a first stage reduction ratio output driving is generated through the driving of the wheel disk 841b and the center gear 841c. A second stage reduction ratio output driving is generated after the center gear 841c is engaged with the rear gears 842a and the cam 101 to rotate. Thus, the cam 101 drives parts of the roller 201 to move into the corresponding spline aperture 311 to contact with the spline surface contour in order to transmit a third stage reduction ratio output driving to drive the bearing 401 to output and rotate. In this implementation, a multi-stage reduction ratio output driving is generated.

In conclusion, in the present invention a server motor can be used as a spin-wave driver and a loading object, such as, a mechanical arm, is connected to its output end. The mechanical arm can move in accurate tiny angle range by the multi-stage reduction ratio output driving, the excellent driving accuracy and the self-locking function. From the common knowledge, it could be known that a driver, such as, a server motor, is shut down by cutting off power and loses driving power and the center shaft of the motor will become a free end not to be maintained. A reverse direction torque against the output rotation direction of the mechanical arm because of its load is formed to exert on the compound type reducer device. According to the self-locking design of the present invention, a self-locking function is generated between the cam, the roller, the bearing member and the spline aperture by using the convex arc design of the cam. That is to say, reverse direction brake against the output rotation is generated to protect the mechanical arm at the output end from dropping and damages of the work components and to protect the transmission components of the compound type reducer device from the resulting un-predictable reverse rotation and damages and risk.

Although the present invention has been explained in relation to its preferred embodiment, it is to be understood that any other possible modifications and variations can be made without departing from the scope of the invention as hereinafter claimed.

We claim:

1. A wave speed reducer having a self-locking function comprising in co-axial arrangement:
   a cam at a cam axis circumference of which being a cam periphery comprising one or more formed convex arcs;
   a spline wheel disposed at a cam circumference, a plurality of spline apertures being arranged at an inner wall of the spline wheel; and
   a bearing member disposed between the cam and the spline wheel, a plurality of bearing apertures being arranged at equal distance at a bearing member circumference, a roller being disposed at an active space of every bearing aperture, the cam driving the convex arc to rotate by an input torque, the convex arc being pressed and pushed to drive the roller to move into a corresponding spline aperture so as to actuate a rotational output at a specific reduction ratio generated by one of the spline wheel and the bearing member;
   wherein, formation of the convex arc is restricted by the following equation:

$F \times R \sin\theta < R \times \mu \times F \cos\theta$ $0 < \theta \leq 4°$ wherein, F is a positive force for the roller pressing on the convex arc, R is a distance between a contact point of the convex arc and the roller and a cam axis, θ is a lead angle of the positive force F, μ is a relative friction coefficient between the convex arc and the roller.

2. The wave speed reducer having a self-locking function as claimed in claim 1, wherein in the following equation:

$F \times R \sin\theta = T_1$ $R \times \mu \times F \cos\theta = T_2$ wherein, $T_1$ is a rotation torque exerting on the convex arc by the roller, $T_2$ is a rotation torque of a component force ($\mu \times F \cos\theta$) for a friction force ($\mu \times F$) when the convex arc contacts the roller.

3. The wave speed reducer having a self-locking function as claimed in claim 1, wherein the cam periphery is formed by a method comprising the following steps:
   (A) slicing radial movement track of a roller between a cam and a spline aperture and circumference rotation track at equal proportion at equal time intervals to sequentially obtain circle centers and point of tangency of the track circles during movement of the roller;
   (B) connecting the points of tangency to form a unit cam circumference segment of a cam periphery; and
   (C) forming the cam periphery by mirroring and projecting the unit cam circumference segment respectively based on a X-coordinate and Y-coordinate from a cam axis.

4. The wave speed reducer having a self-locking function as claimed in claim 3, wherein X-coordinates and Y-coordinates ($X_m$, $Y_m$) of the circle centers of the track circles are obtained according to the following equation $[X_m, Y_m] = [(L_f - M \cdot \Delta y') \cdot \sin(M \cdot \Delta \alpha), (L_f - M \cdot \Delta y') \cdot \cos(M \cdot \Delta \alpha),]$ wherein, $L_f$ is a distance between a cam axis and a circle center of the track circle of a roller far away from the cam axis, M is an equally amount for dividing the single-sided tooth flank contour of the spline aperture, $\Delta y'$ is an equal divided amount of an effective radial displacement for each of the track circles of the roller, $\Delta \alpha$ is an equal divided amount of an effective rotational angle for each of the track circles of the roller.

5. The wave speed reducer having a self-locking function as claimed in claim 4, wherein X-coordinates and Y-coordinates ($X'_m$, $Y'_m$) of the points of tangency of the track circles are obtained according to the following equation $$\{X'_m, Y'_m\} = \left\{X_m + \left(\frac{R_d}{2}\right) \cdot \sin\left[\tan^{-1}\left|\frac{(Y_m - Y_{m-1})}{(X_m - X_{m-1})}\right|\right], Y_m + \left(\frac{R_d}{2}\right) \cdot \cos\left[\tan^{-1}\left|\frac{(Y_m - Y_{m-1})}{(X_m - X_{m-1})}\right|\right]\right\}$$

wherein, m is an integer representing a $m^{th}$ track circle during movement of the roller, m is an integer larger than zero, $R_d$ is a diameter of the roller, ($X_{m-1}$, $Y_{m-1}$) is an X-coordinate and Y-coordinate ($X_m$, $Y_m$) of the $m^{th}$ circle center of the track circles.

6. The wave speed reducer having a self-locking function as claimed in claim 5, wherein the points of tangency of the track circles are connected to form the unit cam circumference segment by a spline line.

7. The wave speed reducer having a self-locking function as claimed in claim 1, wherein the spline aperture has a spline surface contour which is formed by a method comprising the following steps:
   (A) slicing radial movement track of a roller between a cam and a spline aperture and circumference rotation track at equal proportion at equal time intervals to sequentially obtain circle centers and points of tangency of the track circles during movement of the roller;
   (B) connecting the points of tangency to form a single-sided tooth flank contour on spline aperture between a tooth crest and a void between the teeth; and
   (C) forming a correspondent side tooth flank contour by mirroring the single-sided tooth flank contour based on a centerline of the void between the teeth in order to form the spline surface contour by connecting a void contour between the single-sided tooth flank contour and the correspondent side tooth flank contour.

8. The wave speed reducer having a self-locking function as claimed in claim 7, wherein X-coordinates and Y-coordinates $(X_n, Y_n)$ of the circle centers of the track circles are obtained according to the following equation $$[X_n, Y_n] = [(L_f - N \cdot \Delta y) \cdot \sin(N \cdot \Delta \theta), (L_f - N \cdot \Delta y) \cdot \cos(N \cdot \Delta \theta),]$$

Wherein, $L_f$ is a distance between a cam axis and a circle center of the track circle of a roller far away from the cam axis, N is an amount for equally dividing the single-sided tooth flank contour of the spline aperture, $\Delta y$ is an equal divided amount of an effective radial displacement for each of the track circles of the roller, $\Delta \theta$ is an equal divided amount of an effective rotational angle for each of the track circles of the roller.

9. The wave speed reducer having a self-locking function as claimed in claim 8, wherein X-coordinates and Y-coordinates $(X'_n, Y'_n)$ of the points of tangency of the track circles are obtained according to the following equation $$\{X'_n, Y'_n\} = \left\{X_n + \left(\frac{R_d}{2}\right) \cdot \sin\left[\tan^{-1}\left|\frac{(Y_n - Y_{n-1})}{(X_n - X_{n-1})}\right|\right], Y_n + \left(\frac{R_d}{2}\right) \cdot \cos\left[\tan^{-1}\left|\frac{(Y_n - Y_{n-1})}{(X_n - X_{n-1})}\right|\right]\right\}$$

Wherein, n is an integer representing a $n^{th}$ track circle during movement of the roller, n is an integer larger than zero, $R_d$ is a diameter of the roller, $(X_{n-1}, Y_{n-1})$ is an X-coordinate and Y-coordinate $(X_n, Y_n)$ of the $n^{th}$ circle center of the track circles.

10. The wave speed reducer having a self-locking function as claimed in claim 9, wherein the points of tangency of the track circles are connected to form the single-sided tooth flank contour by a spline line.

11. The wave speed reducer having a self-locking function as claimed in claim 7, wherein two points of tangency of the track circles near and between the single-sided tooth flank contour and the correspondent side tooth flank contour are connected to form the void contour which does not interfere with the cam surface of the track circles.

12. The wave speed reducer having a self-locking function as claimed in claim 7, wherein a method for designing a spline wheel contour of roller-type wave-motion comprises the following steps: based on a rotational center of the cam axis, arranging an array of internal cam faces around the spline wheel at equal circumference distance on the spline surface contour to form a spline wheel contour.

13. The wave speed reducer having a self-locking function as claimed in claim 12, wherein two points of tangency of the correspondent track circles far away from the single-sided tooth flank contour and the correspondent side tooth flank contour are angularly connected to form a tooth crest contour by which a roller is guided to move into a neighboring spline aperture to contact spline surface contour.

14. The wave speed reducer having a self-locking function as claimed in claim 1, wherein a hole-shaped tooth ring formed at a cam inner surface is used as a driving force input interface.

15. A compound type reducer device for applying to the wave speed reducer of claim 1 comprising a planetary gear set combined at one side of the wave speed reducer and a cam with a tooth ring at a cam inner surface, wherein the planetary gear set comprises a plurality of planetary gears disposed at a periphery surface of a wheel disk at its one side and spaced apart at equal distance and engaged with each of the tooth rings on the cam, the wheel disk is connected to a spin-wave driver by a shaft.

16. The compound type reducer device as claimed in claim 15, wherein the planetary gear set further comprises a sun gear through which the sun gear is connected to the spin-wave driver by a shaft, the plurality of planetary gears respectively are engaged with the sun gear for receiving transmission.

17. The compound type reducer device as claimed in claim 15, wherein the plurality gear set further comprises a periphery gear used as a fixing end and combined to a circumference of the plurality of planetary gears which comprises a plurality of gear sets, each of which comprises a front gear and a rear gear co-axially arranged, the front gears are engaged with the periphery gear and the plurality of planetary gears are respectively engaged with the tooth ring of the cam by the rear gears.

18. The compound type reducer device as claimed in claim 15, wherein a ring disk is formed and extends from a center of the bearing member to be used as an output shaft.

19. A compound type reducer device for applying to the wave speed reducer of claim 1 comprising a planetary gear set combined at one side of the wave speed reducer, wherein the planetary gear set comprises
 a sun gear connected to a spin-wave driver by a shaft; and
 a plurality of planetary gears disposed at a periphery surface of a cam at its one side and spaced apart at equal distance and respectively engaged with a periphery of the sun gear to drive and rotate the cam.

20. The compound type reducer device as claimed in claim 19, wherein the plurality of planetary gears comprises:
 a first set planetary gear comprising front gears disposed at a periphery surface of a wheel disk at its one side and spaced apart at equal distance, the plurality of planetary gears being combined and engaged with a periphery of the sun gear via the front gears, a center gear being disposed and fixed at a rotation center of the wheel disk at its another side; and
 a second set planetary gear comprising rear gears disposed at a periphery surface of a cam at its one side and spaced apart at equal distance, the rear gears being combined and engaged with a periphery of the center gear.

21. The compound type reducer device as claimed in claim 19, wherein the planetary gears further comprises a periphery gear used as a fixing end, and the periphery gear is combined and engaged with a periphery of the front gears and rear gear.

* * * * *